United States Patent Office 3,222,564
Patented Dec. 7, 1965

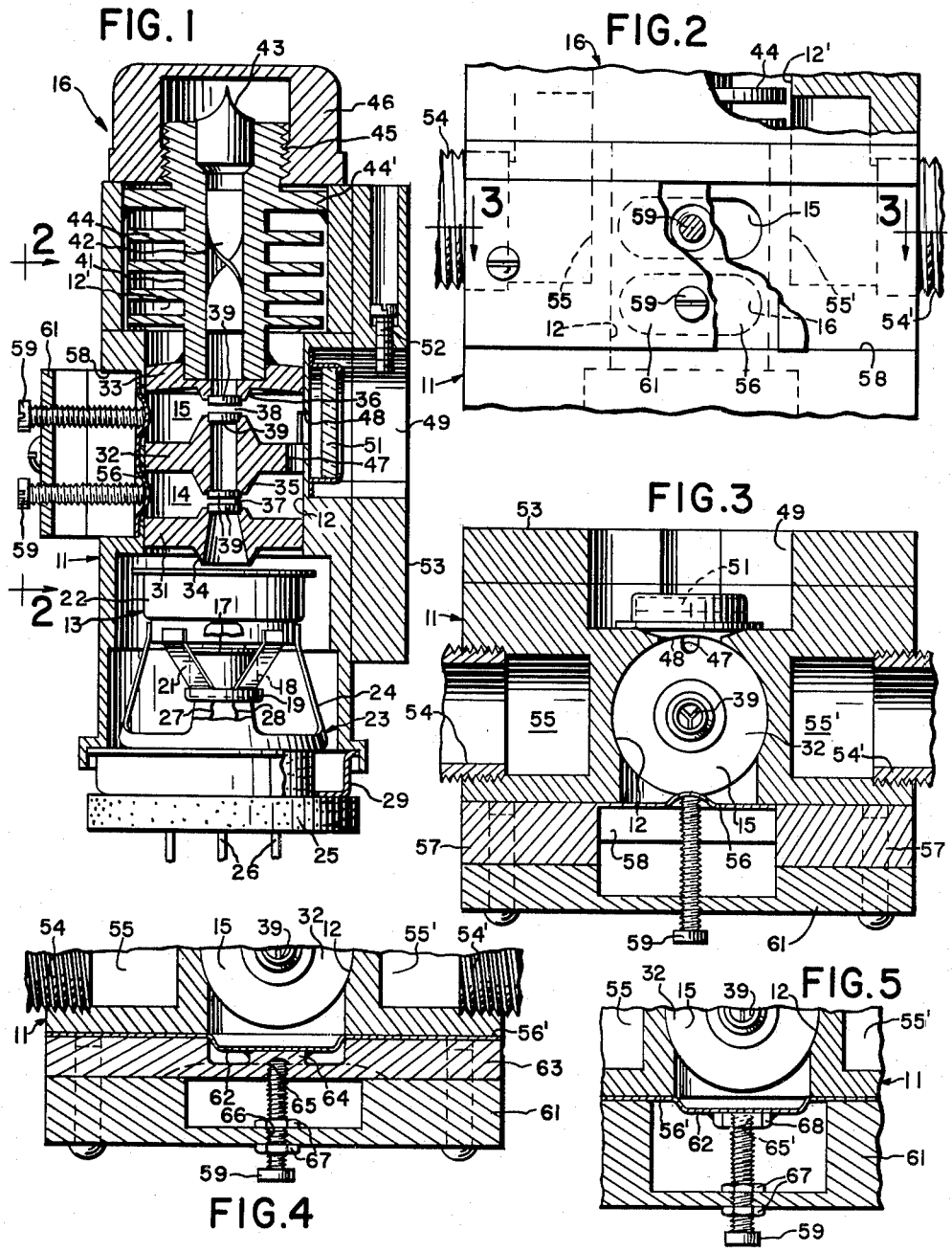

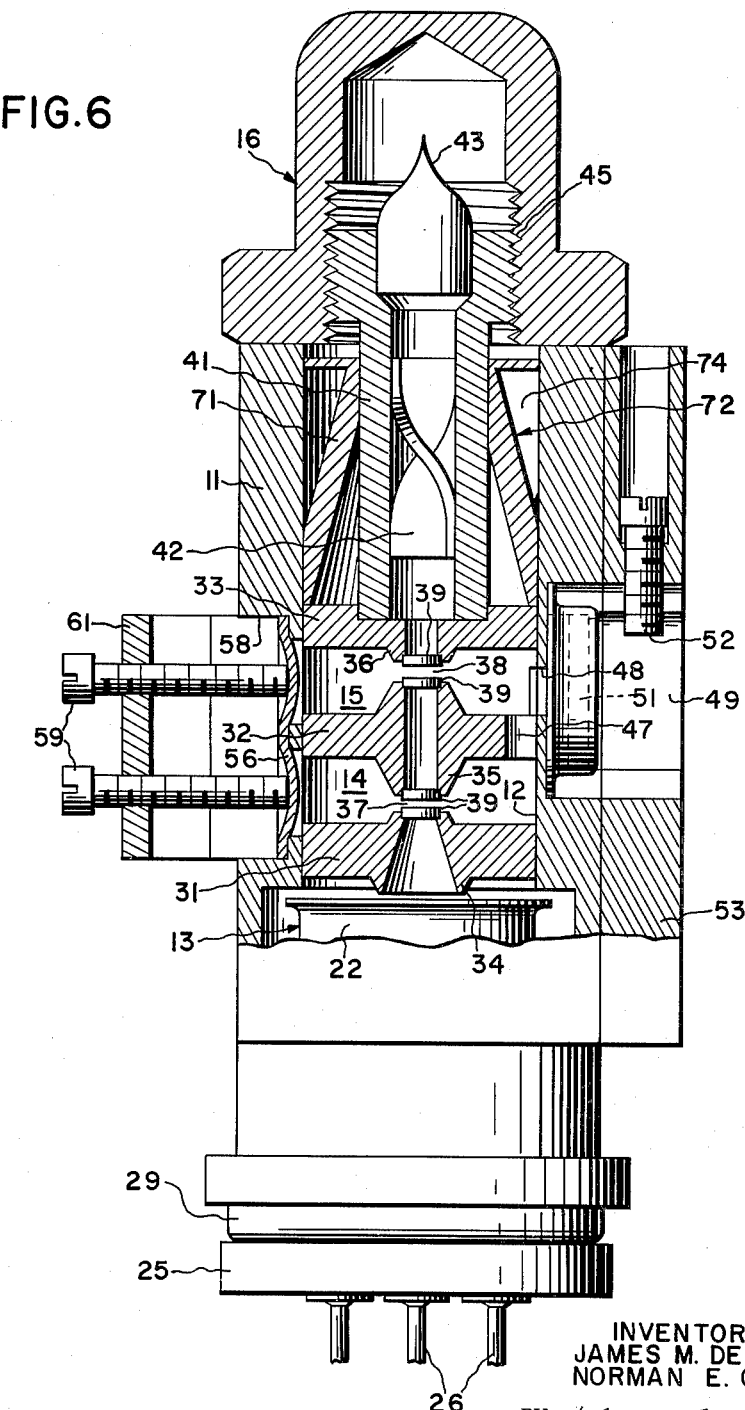

3,222,564
HIGH FREQUENCY ELECTRON DISCHARGE DEVICE WITH TEMPERATURE COMPENSATION CONTROL MEANS
James M. De Pue, Jr., Mountain View, and Norman E. Oaks, Woodside, Calif., assignors to Varian Associates, Palo Alto, Calif., a corporation of California
Filed July 12, 1963, Ser. No. 294,558
8 Claims. (Cl. 315—5.48)

This application is a continuation-in-part of parent co-pending application Serial No. 85,090, filed January 26, 1961, now U.S. Patent No. 3,117,251 issued January 7, 1964, and assigned to the same assignee as the present invention.

This invention relates to high frequency apparatus and more particularly to temperature compensated high frequency apparatus.

Cavity resonators employed in a high frequency apparatus, such as a klystron, are tuned by varying either the total inductance of the cavity or the total capacitance, or both. Cavities are readily tuned by moving movable side walls towards or away from the center of the cavity. In klystrons, the cavity may be tuned by varying the interaction gap spacing. Both of the foregoing are usually done with the aid of a mechanical mechanism. The rate-of-change of frequency per unit length of the movable side wall is inversely proportional to the size of the cavity. This relationship is also true for the rate-of-change of frequency per unit length when the cavity is tuned by changing the gap spacing. Therefore, a klystron operating in the microwave frequency range of more than 10,000 megacycles per second requires a very slight change in the cavity volume or gap spacing to tune the cavity over a few megacycles.

Various types of mechanisms have been provided to accurately control the volume and/or gap spacing of cavities in microwave tubes in order to have precise accurate tuning. Since small changes in cavity volume or gap spacing can cause frequency changes of considerable magnitude, the changes resulting from expansion and constriction of the tube parts with changes in temperature may become appreciable.

It is an object of the present invention to provide a temperature compensated high frequency apparatus.

It is another object of this invention to provide an improved high frequency apparatus capable of operating at substantially constant frequency over a wide range of temperatures.

It is still another feature of the present invention to provide a temperature compensating means for controlling the gap spacing and thus the resonant frequency of high frequency apparatus.

It is another object of the present invention to provide in a klystron means for controlling the interaction gap and thus the capacitance of a cavity resonator associated therewith by applying an axial force to a drift tube section of the klystron by employment of materials having different thermal coefficients of expansion for the various parts of the klystron.

These and other objects of the invention will become more clearly apparent from the following description taken in conjunction with the accompanying drawings wherein:

FIG. 1 is a cross-sectional view of a novel klystron embodying the present invention;

FIG. 2 is the external view of the klystron taken from line 2—2 of FIG. 1;

FIG. 3 is the sectional view of the klystron taken along line 3—3 of FIG. 2 showing one embodiment of the permanently deformable tuning means of the klystron;

FIG. 4 is an alternate embodiment of the permanently deformable tuning means of the klystron;

FIG. 5 is another alternate embodiment of the permanently deformable tuning means of the klystron; and FIG. 6 is a cross-sectional view of another klystron having temperature compensation means.

Referring to the drawings and to FIGS. 1, 2 and 3 in particular, the klystron has a metal block body 11 with a bore 12 therethrough. An electron gun assembly 13 is disposed at one end of the bore to project an electron beam through cavity resonators 14 and 15 to a collector assembly 16 disposed at the other end of the bore 12. The electron gun assembly 13 has a novel structure particularly adapted for use in small high frequency apparatus. A cathode 17 which, in this embodiment, is planar is supported on a cathode can 18 enclosing a heating filament (not shown). The cathode can 18 is disposed within a cup-shape stamping 19. In order to reduce the heat flow path, the side wall of the stamping 19 is formed into fingers 21 which are, in turn, fixed by their ends to the side wall of a tubular focusing electrode 22. The focusing electrode is, of course, disposed concentric with the cathode 17. This sub-assembly is, in turn, mounted within a larger cup-shape stamping 23 which also has its side walls in forms of fingers 24 fixed by their ends to the side wall of the focusing electrode. The stamping 23 is mounted on a dish-shape insulating header 25 having electric lead-through pins 26 sealed in vacuum tight relation therethrough. Leads 27 and 28 of the filament are connected to two of the pins 26. A metal sealing ring 29 is brazed vacuum tight onto the rim of the header 25 and to the body 11 to unite the gun assembly 13 to the body 11. Another one of the pins 26 supplies the correct bias to the cathode and focusing electrode. Within the bore 12 between the collector assembly 16 and electron gun assembly 13 are disposed three apertured partitions 31, 32 and 33 which form the cavity resonators 14 and 15 within the body 11 and partition 31 also forms the anode for the electron gun. The partitions incorporate re-entrant drift tube sections 34, 35 and 36 which serve to define high frequency interaction gaps 37 and 38 between their ends. A grid 39 is placed across each end of the re-entrant drift tube sections so that better interaction is obtained between the beam and the gaps 37 and 38.

The collector asembly 16 includes a collector tube 41 disposed coaxially with the drift tube section 36 and supported by partition or end wall 33. The electrons of the beam are collected on a baffle 42 as of copper disposed within the tube 41 to protect the end of a pinched-off exhaust tubulation 43 and to dissipate the heat generated into an area of the collector where cooling is most conveniently applied. The tubulation 43 is brazed coaxially at the exterior end of tube 41. The collector tube 41 is cooled by a liquid flowing across a plurality of cooling fins 44 which are disposed within an enlarged end portion 12' of the bore 12. The cooling fin 44' disposed on the external end of the collector 41 is brazed at its periphery within the end portion 12' leaving the end of the body 11 protruding axially beyond fin 44'. The exterior end of the collector 41 has an external screw thread 45 on which is disposed a nut 46 which can bear down on the protruding end of the body 11 when the nut 46 is tightened. Since end fin 44' and partition 33 are thin, they can be flexed by an axially aligned force readily imposed by tightening the nut 46 to increase the spacing gap 38 slightly for tuning purposes. When the nut 46 is loosened, the fin 44' and partition 33 spring back slightly since they are typically stressed within their elastic limits and the gap spacing thus slightly decreases.

If the collector tube 41 is made of a material having a different thermal expansion coefficient than that of the material of the wall of the end portion 12', one can control, with temperature, the spacing of the gap 38 by choosing various material; for example, if collector tube 41 is made of steel and the wall of the portion 12' is made of copper, the length or spacing of the gap will increase with temperature as the volume of cavity 15 increases thereby stabilizing the resonant frequency over a broad temperature range.

Inherently, the tube 41, when made of a material having a lower temperature coefficient of expansion than the body 12', as mentioned directly above, will function as a built-in temperature compensation device. The gap spacing 38 will tend to decrease as the partitions or headers 32, 33 are heated under operating conditions. The tube 41 as secured to the cooperative compensating tube portion 12 via nut 46 and header 44 accomplishes temperature stabilization by counteracting the decrease in gap spacing due to the expansion of partitions 32, 33. Tube 41 is flexibly mounted on body 12' by means of end fin or header 44' and partition 33 and fixedly secured to cylindrical body portion 12' via nut 46 tightly bearing against cylinder 12'. Tube 41 is made of a material having a lower temperature coefficient of expansion than the body 12' and thus will increase the gap spacing 38 by flexing header or partition 33 upon heating under operating conditions and thereby counteract the decrease in gap spacing due to the expansion of members 32, 33. This action results in a minimal change in gap spacing and thus minimal frequency drift.

The novel features of the klystron may be incorporated in an amplifier although the klystron shown is an oscillator in that the cavities 14 and 15 are closely coupled through a coupling aperture 47 formed in the partition 32. High frequency energy is coupled from the oscillator through an aperture 48 formed transversely through a wall of body 11 and communicating between the cavity 15 and a waveguide section 49. A window 51 which forms the vacuum wall between the cavity 15 and the waveguide is disposed across aperture 48. Protruding into the waveguide 49 is a matching screw 52 which aids in matching the waveguide circuit (not shown) to the coupling through the aperture 48. A surface 53 on body 11 forms a means for mounting more waveguide sections to form the waveguide circuit to the klystron.

The klystron shown is liquid cooled whereby the liquid enters the body 11 through a port 54, along a channel 55 in body 11 parallel to the beam axis, transversely across the collector cooling fins 44, along a channel 55', and exits through port 54'.

Normally in a small high frequency apparatus of the type described, the dimensions of the cavity resonators must be held to close tolerance so that they will resonate at the prescribed frequencies. Close tolerances are difficult and expensive to maintain in mass production and, therefore, the cavities must be tuned to the prescribed frequency after assembly by deforming a thin wall 56 which is disposed on body 11 parallel to the beam axis. In the embodiment shown in FIG. 3, the thin wall 56 has thicker end portions 57 and is brazed within a transverse cut 58 on the body 11 but the thin wall 56 may be machined as an integral part of the body 11. The wall 56 is deformable inwardly of the cavities 14 and 15 by screws 59 threaded on a tuning bridge 61 which is, in turn, mounted on end portions 57. When the screws 59 are screwed into the bridge 61, the wall 56 is stressed beyond its elastic limit and permanently deformed.

An alternate embodiment of the permanently deformable means is shown in FIG. 4. The deformable wall 56' in FIG. 4 can be moved towards or away from the beam axis thereby increasing or decreasing the resonant frequency of the cavities. The wall 56' is, in this embodiment, preferably of uniform cross-section with a dimple 62 disposed in the wall 56' where it forms the cavity 15. The legs of a U-shaped member 63 are brazed onto the exterior of wall 56' and a lug 64 depending from the center of the member 63 is brazed onto the dimple 62. A tapped-well 65 is formed in member 63 into which the screw 59 is threaded, but in this embodiment the screw 59 cannot be threaded in the tuning bridge 61 but is disposed in an aperture 66. Therefore, nuts 67 are disposed on both sides of the bridge to control the location of the tuning screw 59. Thus, by moving the screw towards or away from the beam axis, the wall 56' along with U-shaped member 63 are stressed beyond their elastic limit and permanently deformed.

Referring to FIG. 5, another embodiment of the permanently deformable tuning means is shown. In this embodiment, the wall 56' with its dimple 62 is also brazed to body 11 similar to the embodiment shown in FIG. 4. At the center of the dimple 62 is disposed a small block of metal 68 having a tapped-well 65'. The block of metal 68 is smaller than the cavity opening which the thin wall closes. Screw 59 is threaded into the tapped well 65' in the block 68, and by adjusting nuts 67, the wall 56' is pushed either towards or away from the beam axis. If the mass of the block 68 is sufficiently small, the wall 56' is permanently deformed and thereby "oil-canning" of the wall 56 is prevented.

Preferably, after the apparatus is pretuned, the tuning bridge 61 in all embodiments is removed and a protective cover plate (not shown) is placed where the bridge 61 was thereby protecting the thin wall 56 from being damaged or deformed.

In the foregoing embodiments, temperature compensation is obtained by moving the apertured partition or end wall 33 by application of an axial force obtained by employing materials having different thermal coefficients of expansion for the collector cylinder and the walls of the electron device. The materials are selected such that expansion of the walls of the electron device provide an axial force which moves the end wall or apertured partition to control the spacing of the gap 38. The net result is to maintain a substantially constant frequency.

In certain instances, it may be desirable to employ a low thermal coefficient of expansion end wall material 12' rather than a material such as copper. Referring to FIG. 6, there is shown another device in accordance with the invention which likewise uses metals having different coefficients of expansion for applying an axial force to the end wall for temperature compensation. The parts in FIG. 6 bear reference numerals like those previously described, where applicable. Such parts are not described in the following discussion.

In the embodiment shown, the collector tube or cylinder 41 is not provided with radial fins but rather has a cylindrical outer periphery. A frustro conical shaped expansion member or strut 71 is brazed to the outside surface of the cylindrical collector at a region 72 spaced from the end wall or partition 33. The other end of the strut is suitably attached, as by brazing, to the body 11. The strut 71 functions to provide the axial force for moving the end wall 33 to control the gap spacing. By choosing a strut having a higher thermal coefficient of expansion than the collector, the force on the end wall 33 will be such as to increase the gap spacing with increases in temperature to thereby compensate for the decrease in gap spacing caused by expansion of the diaphragms or headers 32, 33 and associated drift tubes 35, 36 to thereby maintain a constant gap spacing and thus minimize frequency drift. For example, the collector may be made of Kovar and the strut, copper.

The specific temperature compensation techniques illustrated in FIG. 6 and described herein are claimed in copending U.S. application Serial No. 294,559 by Norman E. Oaks and assigned to the same assignee as the present invention.

Thus, it is seen that effective temperature compensation is achieved by employing a structure which surrounds and cooperates with the collector and has a different temperature coefficient of expansion whereby to control the gap spacing responsive to changes in temperature.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency apparatus comprising a metal body having a bore therethrough, an electron gun assembly disposed at one end of said bore for projecting an electron beam along the axis of said bore, a collector assembly including a hollow beam collector member disposed at the other end of said bore, a plurality of drift tube sections disposed coaxially within said bore and forming interaction gaps, said hollow collector member being suitably mounted to the end drift tube section, and means having a different thermal coefficient of expansion than said collector member engaging the end of said hollow collector member remote from the drift tube section such that temperature compensation of the apparatus is effected.

2. A high frequency apparatus comprising a metal body having a bore therethrough, an electron gun assembly disposed on one end of said bore for projecting an electron stream along the axis of said bore into a collector assembly, a plurality of drift tubes disposed coaxially within said bore and forming an interaction gap between two of said drift tubes, a collector assembly comprising a cylindrical member fixedly secured to the downstream end thereof and flexibly secured at the upstream end thereof to the walls of said bore, said cylindrical member being made of a metal having a different thermal coefficient of expansion than the metal of said body and operatively connected to one of such drift tubes whereby temperature compensation of the apparatus is effected.

3. A high frequency apparatus comprising an electron gun assembly for projecting an electron beam along an axis, at least one cavity resonator having an interaction gap of predetermined spacing disposed with the gap in cooperative relationship with the beam, a collector assembly disposed along the axis to receive the electron beam, and said collector assembly including temperature responsive means for controlling the gap spacing in a manner such that the gap spacing is controlled as the temperature varies to effect temperature compensation of the apparatus said at least one cavity resonator being defined on the downstream end thereof by an apertured end wall partition, said collector assembly including, a hollow beam collector member, said hollow beam collector member having a thermal coefficient of expansion of one value, a metal member disposed along said hollow beam collector member said metal member having a different thermal coefficient of expansion than said hollow beam collector member, said gap spacing being primarily controlled by the differential thermal expansion occurring between said hollow beam collector member and said metal member.

4. A high frequency apparatus comprising an electron gun assembly for projecting an electron beam along an axis, at least one cavity resonator having spaced walls carrying first and second drift tube sections which cooperate to define an interaction gap of predetermined spacing, said cavity resonator being disposed so that the interaction gap cooperates with the electron beam, a collector assembly disposed along the axis of said apparatus to receive the electron beam, and temperature responsive means including first and second members having different thermal coefficients of expansion, said first member engaging one of said cavity walls at a region adjacent the drift tube and said second member engaging said one cavity wall at a region spaced from said drift tube, said first and second members cooperating at a point remote from said drift tube section whereby the gap spacing is controlled as the temperature varies to effect temperature compensation of the apparatus.

5. A high frequency apparatus comprising a metal body having a bore therethrough, an electron gun assembly disposed at one end of said bore for projecting an electron beam along the axis of said bore, a collector assembly including a hollow collector member disposed at the other end of said bore, a plurality of drift tube sections disposed coaxially within said bore and forming interaction gaps, said hollow collector member being mounted to the end drift tube section, and means having a different thermal coefficient of expansion surrounding said collector member and engaging said collector member at a region remote from the drift tube section in a manner such that temperature compensation of the apparatus is effected.

6. A high frequency klystron apparatus including a metal body having a bore therethrough, an electron gun assembly disposed at the upstream end portion of said klystron apparatus for projecting an electron beam along the beam axis of said klystron apparatus, a collector assembly disposed at the downstream end portion of said klystron apparatus and at least one cavity resonator disposed along said beam axis intermediate said electron gun and said collector, said at least one cavity resonator having an interaction gap therein which is disposed about the beam axis of said klystron apparatus, said at least one cavity resonator having a downstream end wall which has a field free region therein through which the beam travels into said collector, said collector including a hollow member mounted on said downstream end wall, said hollow member having a thermal coefficient of expansion which is different than the thermal coefficient of expansion of the metal body of the klystron apparatus, said hollow member being adapted and arranged in conjunction with said body such that temperature compensation of said klystron apparatus is effected in use.

7. The klystron apparatus defined in claim 6 wherein said hollow member has a lower thermal coefficient of expansion than said metal body.

8. The klystron apparatus defined in claim 6 wherein said hollow member has a transverse fin member mounted thereon downstream from said downstream end wall of said at least one cavity resonator, said fin member being fixedly secured to said metal body.

No references cited.

ROBERT SEGAL, *Primary Examiner.*
V. LA FRANCHI, *Examiner.*